US012726472B2

(12) United States Patent
Kumar et al.

(10) Patent No.: US 12,726,472 B2
(45) Date of Patent: Sep. 1, 2026

(54) AUTHENTICATION AND AUTHORIZATION OF REQUESTS FOR RESOURCES VIA AN ACCESS CONTROL SERVER

(71) Applicant: NUTANIX, INC., San Jose, CA (US)

(72) Inventors: Abhisek Kumar, Ramgarh (IN); Aditya Vilas Jaltade, San Jose, CA (US); Aman Gupta, Uttar Pradesh (IN); Bharat Kumar Beedu, Palo Alto, CA (US); Freddy James, Ramgarh (IN); Malay Kantilal Prajapati, Dublin, CA (US); Pranab Patnaik, Cary, NC (US); Vaibhav Sanap, Bengaluru (IN)

(73) Assignee: NUTANIX, INC., San Jose, CA (US)

( * ) Notice: Subject to any disclaimer, the term of this patent is extended or adjusted under 35 U.S.C. 154(b) by 33 days.

(21) Appl. No.: 18/898,517

(22) Filed: Sep. 26, 2024

(65) Prior Publication Data

US 2026/0089153 A1 Mar. 26, 2026

(51) Int. Cl.
*H04L 9/40* (2022.01)

(52) U.S. Cl.
CPC ............ *H04L 63/083* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |

(Continued)

FOREIGN PATENT DOCUMENTS

| | | | |
|---|---|---|---|
| CN | 102546648 | B | 4/2015 |
| CN | 104580177 | A | 4/2015 |

(Continued)

OTHER PUBLICATIONS

Extended European Search Report for Application No. 25204728.7 dated Dec. 2, 2025.

(Continued)

*Primary Examiner* — Scott B Christensen
(74) *Attorney, Agent, or Firm* — Artegis Law Group, LLP

(57) ABSTRACT

Techniques for authenticating user access to a resource and providing access to the resource include non-transitory computer-readable media storing program instructions that, when executed by one or more processors associated with a first computing device, cause the one or more processors to perform a method including receiving, from a client device, a first request for an authentication token to access a resource and identifying a second computing device through which the resource is accessible. The method further includes transmitting a second request to the second computing device for the authentication token, receiving a signed authentication token from the second computing device, wherein the authentication token is signed by the second computing device and specific to the client device, and providing the signed authentication token to the client device.

30 Claims, 10 Drawing Sheets

(56) References Cited

U.S. PATENT DOCUMENTS

| | | | | |
|---|---|---|---|---|
| 9,069,708 | B2 | 6/2015 | Gill et al. | |
| 9,336,132 | B1 | 5/2016 | Aron et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 11,128,464 | B1 | 9/2021 | Loladia | |
| 11,563,580 | B2 | 1/2023 | Sugarev | |
| 11,736,467 | B2 | 8/2023 | Blasi | |
| 2014/0189808 | A1 | 7/2014 | Mahaffey et al. | |
| 2015/0254441 | A1* | 9/2015 | Sanso | G06F 21/41 726/9 |
| 2015/0378769 | A1* | 12/2015 | Buck | G06F 9/45533 718/1 |
| 2017/0126685 | A1 | 5/2017 | Taylor et al. | |
| 2022/0173901 | A1* | 6/2022 | Garcia Valenzuela | H04L 63/0823 |
| 2022/0368675 | A1* | 11/2022 | Narula | H04L 63/166 |
| 2023/0088927 | A1 | 3/2023 | Mukherjee et al. | |
| 2023/0412382 | A1 | 12/2023 | Palanisamy et al. | |
| 2024/0012923 | A1 | 1/2024 | Madhur et al. | |
| 2024/0080200 | A1* | 3/2024 | Seidman | H04L 9/14 |

FOREIGN PATENT DOCUMENTS

| | | | |
|---|---|---|---|
| CN | 112153630 | A | 12/2020 |
| CN | 113992415 | B | 1/2022 |
| CN | 115735204 | A | 3/2023 |
| JP | 2015201098 | A | 11/2015 |
| KR | 102247132 | B1 | 5/2021 |

OTHER PUBLICATIONS

IBM Documentation, "How it works: Authentication in CICS", retrieved from https://www.ibm.com/docs/en/cics-ts/6.x?topic=cics-how-it-works-authentication-in, XP093338883, on Feb. 2, 2026, 4 pages.

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

Ctirix Validated Solutions, "Citrix XenDesktop 7.1 on Microsoft Hyper-V Server 2012 R2 on Nutanix Virtual Computing Platform Solution Design", Prepared by: Citrix Validated Solutions, Jun. 25, 2014, 95 pages.

Poitras, Steven, The Nutanix Bible—Classic Edition, Sep. 26, 2024, 284 pages, https://www.nutanixbible.com/pdf/classic.pdf.

Leander et al., "Access Control Enforcement Architectures for Dynamic Manufacturing Systems", https://www.ipr.mdu.se/pdf_publications/6599.pdf, 2023, 11 pages.

Asgardeo Docs, "Token validation by resource servers", online guide, retrieved Sep. 26, 2024, 3 pages. https://wso2.com/asgardeo/docs/guides/authentication/oidc/token-validation-resource-server/.

Asgardeo Docs, "OIDC settings for apps", OIDC configurations online guide, retrieved Sep. 26, 2024, 9 pages. https://wso2.com/asgardeo/docs/references/app-settings/oidc-settings-for-app/#access-token.

oauth.com, "The Resource Server", online guide, retrieved Sep. 26, 2024, 6 pages. https://www.oauth.com/oauth2-servers/the-resource-server/.

oauth.com, "Self-Encoded Access Tokens", online guide, retrieved Sep. 26, 2024, 8 pages. https://www.oauth.com/oauth2-servers/access-tokens/self-encoded-access-tokens/.

oauth.com, "Scope", online guide, retrieved Sep. 26, 2024, 3 pages. https://www.oauth.com/oauth2-servers/scope/.

oauth.com, "OAuth 2.0 explained", online guide, retrieved Sep. 26, 2024, 12 pages. https://connect2id.com/learn/oauth-2.

oauth.com, "Token Introspection Endpoint", online guide, retrieved Sep. 26, 2024, 8 pages. https://www.oauth.com/oauth2-servers/token-introspection-endpoint/.

* cited by examiner

AUTHENTICATION AND AUTHORIZATION OF REQUESTS FOR RESOURCES VIA AN ACCESS CONTROL SERVER

BACKGROUND

Field of the Various Embodiments

Embodiments of the present invention relate generally to data storage technologies, and more specifically, authentication and authorization of requests for resources via an access control server.

Description of the Related Art

In distributed storage systems, it is common for users, via a client device, to access data through an access control server that performs user authentication. The access control server often performs request authorization to determine whether the user is authorized to access the data that the user is requesting. Once the user is authenticated and then the request is authorized, the request data is fetched by the access control server from a resource server and provided to the requesting client device by the access control server.

In alternative architectures, a federated authentication framework is often utilized. For example, the user, via a client device, requests access to a resource through an access control server. The access control server performs user authentication, generates an authentication token, and provides the authentication token to the requesting client device. The access control server then redirects the client device to a resource server. The requesting client devices provides the authentication token generated by the access control server to a resource server where the requested resource is stored. The resource server requests validation of the authentication token by the access control server or another authentication server. In some cases, once the access control server or the authentication server authenticates the user and provides the authentication to the resource server, the resource server provides access to the requested resource. In this approach, the resource server must be paired in some way to the access control server to enable validation of the authentication token generated by the access control server.

In either approach, the access control server can be a bottleneck for accessing data stored on the resource server. Should the access control server receive numerous requests at once, access to the data stored by the resource server can be slowed as a result.

As the foregoing indicates, what is needed in the art are methods and systems that allow for different approaches to user authentication and authorization.

SUMMARY

The disclosed embodiments describe techniques for enabling a client device to access data in distributed storage systems by authenticating a user identity with an access control server, determining whether the user is authorized to access the requested resource, and then facilitating access to the requested resource by the client device directly from resource servers without the need for a federated authentication implementation.

In various embodiments, one or more non-transitory computer-readable media storing program instructions that, when executed by one or more processors, cause the one or more processors to perform a method comprising receiving, from a client device, a request for an authentication token to access a resource, identifying a second computing device through which the resource is accessible, transmitting a request to the second computing device for the authentication token, receiving a signed authentication token from the second computing device, wherein the authentication token is signed by the second computing device and specific to the client device; and providing the signed authentication token to the client device Further embodiments provide, among other things, methods and systems for implementing one or more aspects of the disclosed techniques.

At least one technical advantage of the disclosed techniques relative to the prior art is that, with the disclosed techniques, an access control server performs user authentication and authorization. The resource control server can then provide a requested resource to a client device without requiring the access control server to further validate the user. Additionally, the resource control server can provide the requested resource directly to the client device without having to provide the requested resource through the access control server. The use of the disclosed techniques improves scalability in distributed storage systems because the access control server is not required to fetch data from the resource server and provide the requested data to client devices, thereby removing a potential bottleneck in distributed systems. Additionally, the access control server is not required to validate or authenticate a client device for every resource request if the client device presents an authentication token that can be validated by the resource server. Also, the disclosed techniques reduce implementation complexity by removing the need for a federated authentication deployment that requires a key exchange between an access control server and resource servers from which data is retrieved by client devices. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
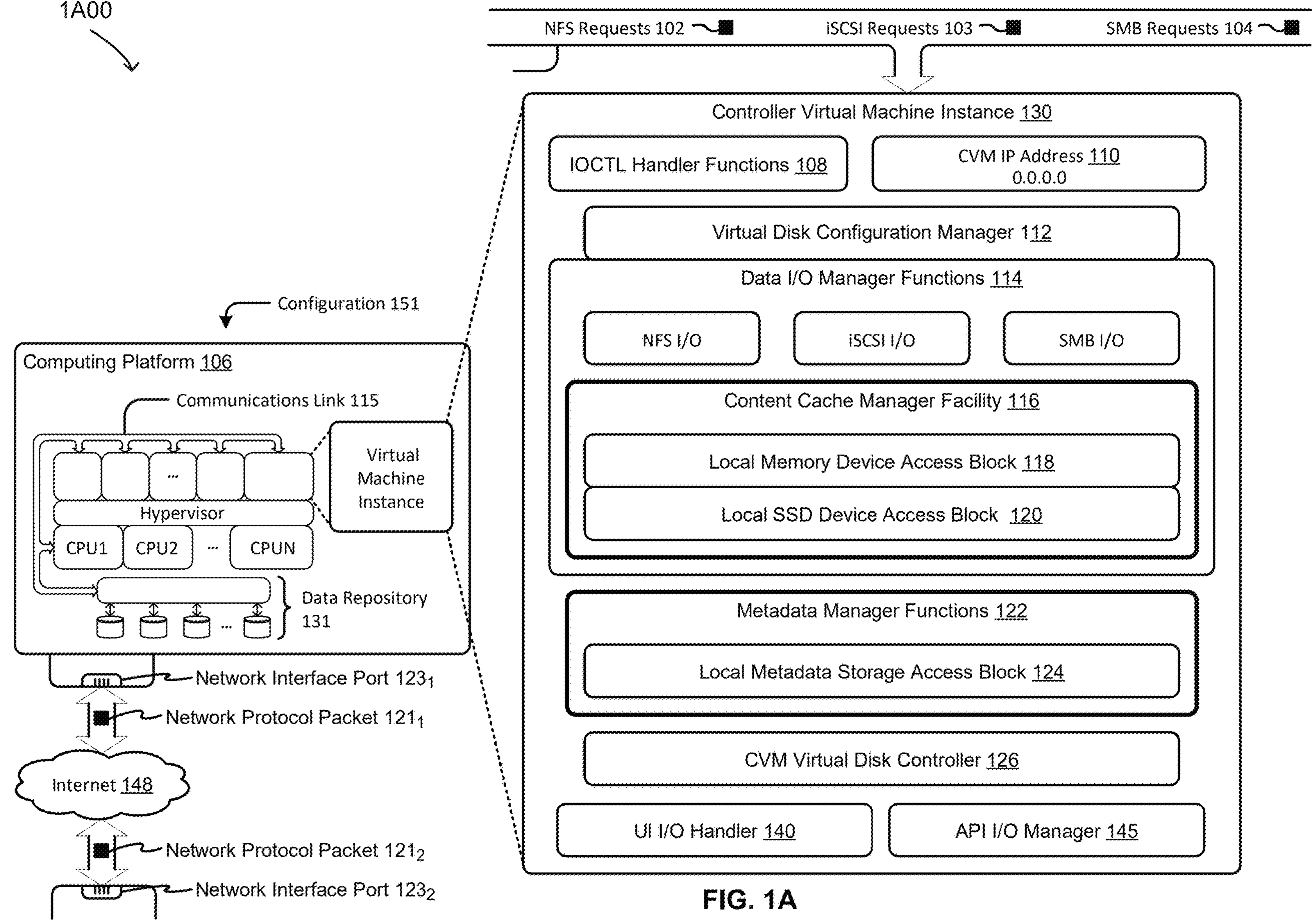
FIGS. 1A-1D are block diagrams illustrating virtualization system architectures configured to implement one or more aspects of the present embodiments.

In the following description, various concepts and examples are disclosed that provide more effective techniques for accessing business data using executable code included in authorization identifiers. The numerous specific details set forth will provide artisans with a more thorough understanding of the various embodiments. However, it will be apparent to one skilled in the art that the inventive concepts can be practiced without one or more of these specific details.

Exemplary Virtualization System Architectures

According to some embodiments, all or portions of any of the disclosed techniques can be partitioned into one or more modules and instances within, or as, or in conjunction with a virtualized controller in a virtual computing environment. Some example instances within various virtual computing environments are shown and discussed in further detail in FIGS. 1A-1D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

FIG. 1A is a block diagram illustrating virtualization system architecture 1A00 configured to implement one or more aspects of the present embodiments. As shown in FIG. 1A, virtualization system architecture 1A00 includes a collection of interconnected components, including a controller virtual machine (CVM) instance 130 in a configuration 151. Configuration 151 includes a computing platform 106 that supports virtual machine instances that are deployed as user virtual machines, or controller virtual machines or both. Such virtual machines interface with a hypervisor (as shown). In some examples, virtual machines can include processing of storage I/O (input/output or IO) as received from any or every source within the computing platform. An example implementation of such a virtual machine that processes storage I/O is depicted as CVM instance 130.

In this and other configurations, a CVM instance receives block I/O storage requests as network file system (NFS) requests in the form of NFS requests 102, internet small computer storage interface (iSCSI) block IO requests in the form of iSCSI requests 103, Samba file system (SMB) requests in the form of SMB requests 104, and/or the like. The CVM instance publishes and responds to an internet protocol (IP) address (e.g., CVM IP address 110). Various forms of input and output can be handled by one or more IO control handler functions (e.g., IOCTL handler functions 108) that interface to other functions such as data IO manager functions 114 and/or metadata manager functions 122. As shown, the data IO manager functions can include communication with virtual disk configuration manager 112 and/or can include direct or indirect communication with any of various block IO functions (e.g., NFS IO, ISCSI IO, SMB IO, etc.).

In addition to block IO functions, configuration 151 supports IO of any form (e.g., block IO, streaming IO, packet-based IO, HTTP traffic, etc.) through either or both of a user interface (UI) handler such as UI IO handler 140 and/or through any of a range of application programming interfaces (APIs), possibly through API IO manager 145.

Communications link 115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry can be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 106 includes one or more computer readable media that is capable of providing instructions to a data processor for execution. In some examples, each of the computer readable media can take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 130 includes content cache manager facility 116 that accesses storage locations, possibly including local dynamic random-access memory (DRAM) (e.g., through local memory device access block 118) and/or possibly including accesses to local solid-state storage (e.g., through local SSD device access block 120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 131, which in turn can be formatted into any one or more storage areas, and which can comprise parameterized storage accessible by a key (e.g., a filename, a table name, a block address, an offset address, etc.). Data repository 131 can store any forms of data and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 124. The data repository 131 can be configured using CVM virtual disk controller 126, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 151 can be coupled by communications link 115 (e.g., backplane, LAN, PSTN, wired or wireless network, etc.) and each instance can perform respective portions of sequences of instructions as can be required to practice embodiments of the disclosure.

The shown computing platform 106 is interconnected to the Internet 148 through one or more network interface ports (e.g., network interface port 1231 and network interface port 1232). Configuration 151 can be addressed through one or more network interface ports using an IP address. Any operational element within computing platform 106 can perform sending and receiving operations using any of a range of network protocols, possibly including network protocols that send and receive packets (e.g., network protocol packet 1211 and network protocol packet 1212).

Computing platform 106 can transmit and receive messages that can be composed of configuration data and/or any other forms of data and/or instructions organized into a data structure (e.g., communications packets). In some cases, the data structure includes program instructions (e.g., application code) communicated through the Internet 148 and/or through any one or more instances of communications link 115. Received program instructions can be processed and/or executed by a CPU as it is received and/or program instructions can be stored in any volatile or non-volatile storage for later execution. Program instructions can be transmitted via an upload (e.g., an upload from an access device over the Internet 148 to computing platform 106). Further, program instructions and/or the results of executing program instructions can be delivered to a particular user via a download (e.g., a download from computing platform 106 over the Internet 148 to an access device).

Configuration 151 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 1B:
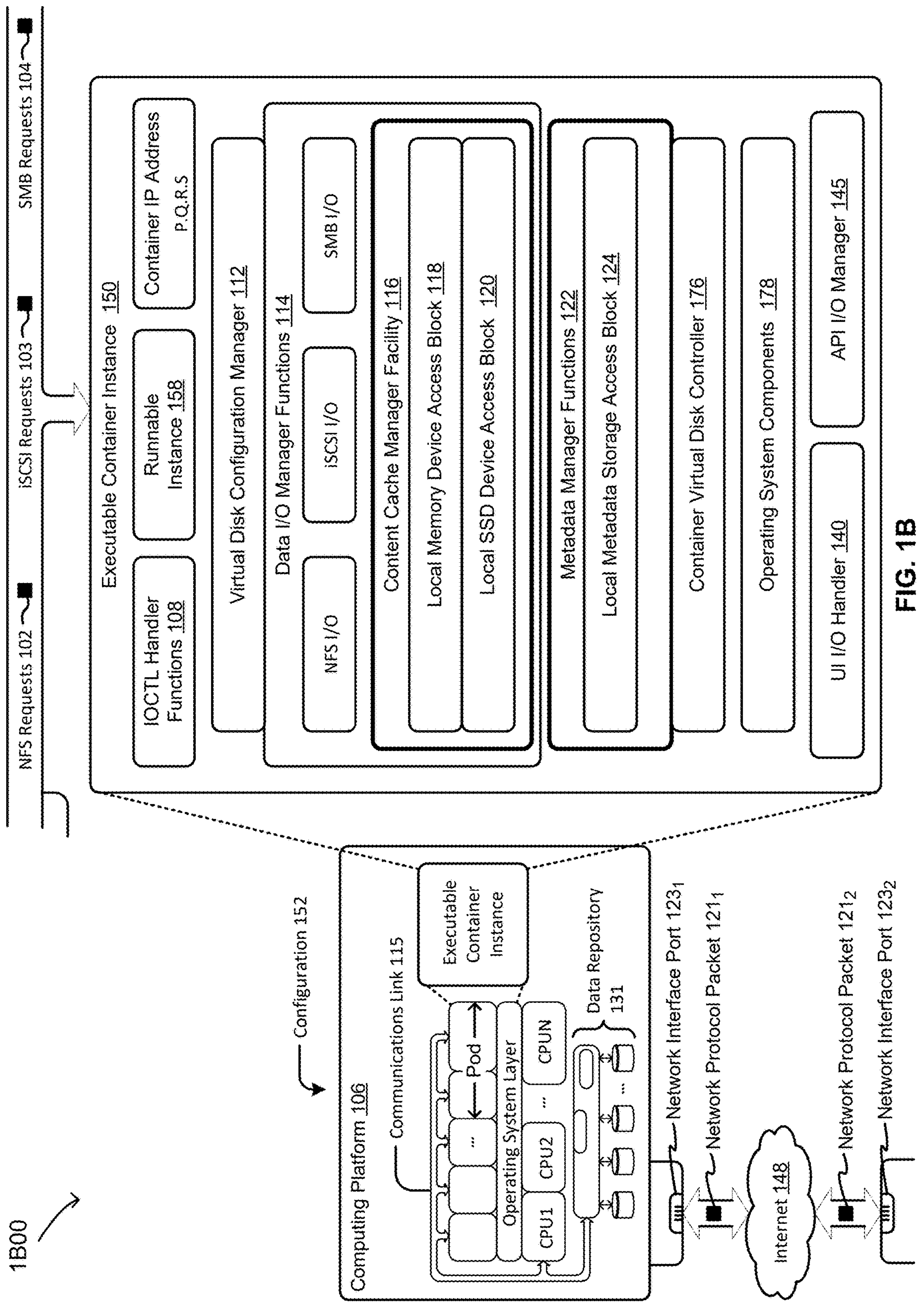

FIG. 1B depicts a block diagram illustrating another virtualization system architecture 1B00 configured to implement one or more aspects of the present embodiments. As shown in FIG. 1B, virtualization system architecture 1B00 includes a collection of interconnected components, including an executable container instance 150 in a configuration 152. Configuration 152 includes a computing platform 106 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node can communicate directly with storage devices on the second node.

The operating system layer can perform port forwarding to any executable container (e.g., executable container instance 150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and can include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "Is" or "Is-a", etc.). The executable container might optionally include operating system components 178, however such a separate set of operating system components need not be provided. As an alternative, an executable container can include runnable instance 158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 176. Such a container virtual disk controller can perform any of the functions that the aforementioned CVM virtual disk controller 126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 1C:
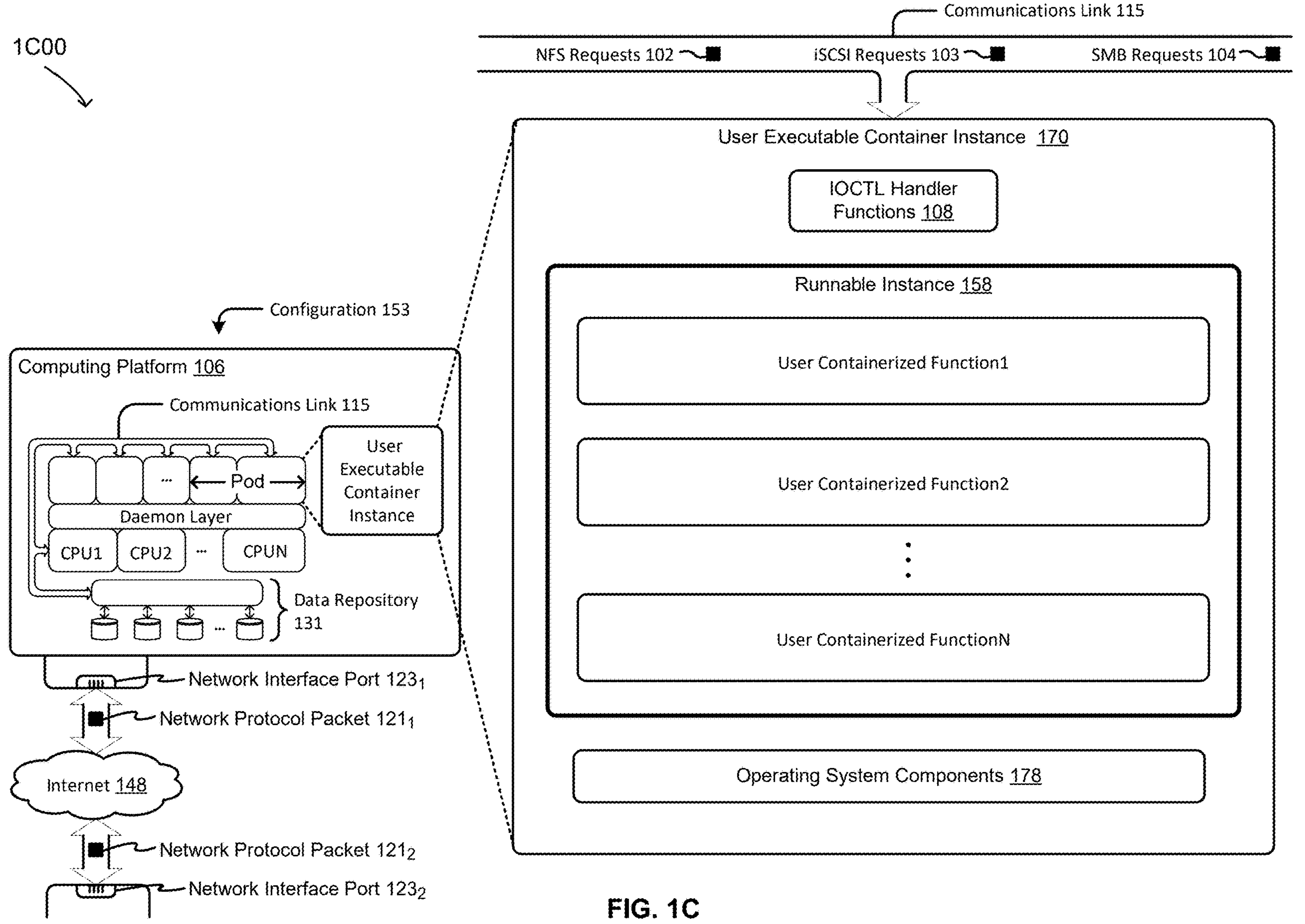

FIG. 1C is a block diagram illustrating virtualization system architecture 1C00 configured to implement one or more aspects of the present embodiments. As shown in FIG. 1C, virtualization system architecture 1C00 includes a collection of interconnected components, including a user executable container instance in configuration 153 that is further described as pertaining to user executable container instance 170. Configuration 153 includes a daemon layer (as shown) that performs certain functions of an operating system.

User executable container instance 170 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 158). In some cases, the shown operating system components 178 comprise portions of an operating system, which portions are interfaced with or included in the runnable instance and/or any user containerized functions. In some embodiments of a daemon-assisted containerized architecture, computing platform 106 might or might not host operating system components other than operating system components 178. More specifically, the shown daemon might or might not host operating system components other than operating system components 178 of user executable container instance 170.

In some embodiments, the virtualization system architecture 1A00, 1B00, and/or 1C00 can be used in any combination to implement a distributed platform that contains multiple servers and/or nodes that manage multiple tiers of storage where the tiers of storage might be formed using the shown data repository 131 and/or any forms of network accessible storage. As such, the multiple tiers of storage can include storage that is accessible over communications link 115. Such network accessible storage can include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 151) to manage the interactions between the underlying hardware and user virtual machines or containers that run client software.

Distinct from user virtual machines or user executable containers, a special controller virtual machine (e.g., as depicted by controller virtual machine instance 130) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 1D:
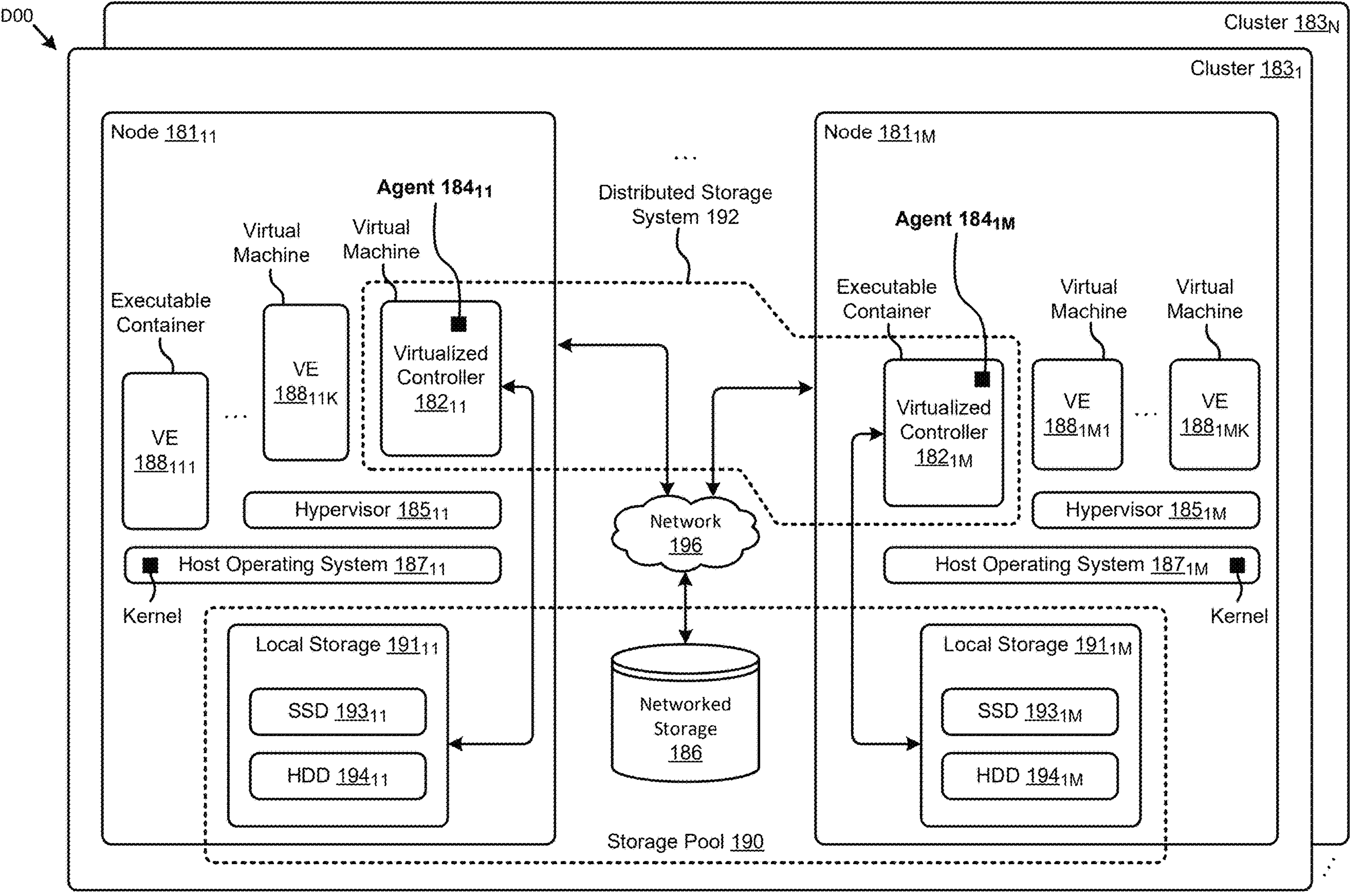

FIG. 1D is a block diagram illustrating virtualization system architecture 1D00 configured to implement one or more aspects of the present embodiments. As shown in FIG. 1D, virtualization system architecture 1D00 includes a distributed virtualization system that includes multiple clusters (e.g., cluster $\mathbf{183}_1$, . . . , cluster $\mathbf{183}_N$) comprising multiple nodes that have multiple tiers of storage in a storage pool. Representative nodes (e.g., node $\mathbf{181}_{11}$, . . . , node $\mathbf{181}_{1M}$) and storage pool 190 associated with cluster $\mathbf{183}_1$ are shown. Each node can be associated with one server, multiple servers, or portions of a server. The nodes can be associated (e.g., logically and/or physically) with the clusters. As shown, the multiple tiers of storage include storage that is accessible through a network 196, such as a networked storage 186 (e.g., a storage area network or SAN, network attached storage or NAS, etc.). The multiple tiers of storage further include instances of local storage (e.g., local storage $\mathbf{191}_{11}$, . . . , local storage $\mathbf{191}_{1M}$). For example, the local storage can be within or directly attached to a server and/or appliance associated with the nodes. Such local storage can include solid state drives (SSD $\mathbf{193}_{11}$, . . . , SSD $\mathbf{193}_{1M}$), hard disk drives (HDD $\mathbf{194}_{11}$, . . . , HDD $\mathbf{194}_{1M}$), and/or other storage devices.

As shown, any of the nodes of the distributed virtualization system can implement one or more user virtualized entities (e.g., VE $\mathbf{188}^{111}$, . . . , VE $\mathbf{188}^{11K}$, . . . , VE $\mathbf{188}^{1M1}$, . . . , VE $\mathbf{188}^{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{187}^{11}$, . . . , host operating system $\mathbf{187}^{1M}$), while the VMs run multiple applications on various respective guest operating systems. Such flexibility can be facilitated at least in part by a hypervisor (e.g., hypervisor $\mathbf{185}^{11}$, . . . , hypervisor $\mathbf{185}^{1M}$), which hypervisor is logically located between the various guest operating systems of the VMs and the host operating system of the physical infrastructure (e.g., node).

As an alternative, executable containers can be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $\mathbf{187}_{11}$, . . . , host operating system $\mathbf{187}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 190 by the VMs and/or the executable containers.

Multiple instances of such virtualized controllers can coordinate within a cluster to form the distributed storage system 192 which can, among other operations, manage the storage pool 190. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{181}_{11}$ can interface with a controller virtual machine (e.g., virtualized controller 18211) through hypervisor $\mathbf{185}_{11}$ to access data of storage pool 190. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 192. For example, a hypervisor at one node in the distributed storage system 192 might correspond to software from a first vendor, and a hypervisor at another node in the distributed storage system 192 might correspond to a second software vendor. As another virtualized controller implementation example, executable containers can be used to implement a virtualized controller (e.g., virtualized controller $\mathbf{182}_{1M}$) in an operating system virtualization environment at a given node. In this case, for example, the virtualized entities at node $\mathbf{181}_{1M}$ can access the storage pool 190 by interfacing with a controller container (e.g., virtualized controller $\mathbf{182}_{1M}$) through hypervisor $\mathbf{185}_{1M}$ and/or the kernel of host operating system $\mathbf{187}_{1M}$.

In some embodiments, one or more instances of an agent can be implemented in the distributed storage system 192 to facilitate the herein disclosed techniques. Specifically, agent $\mathbf{184}_{11}$ can be implemented in the virtualized controller $\mathbf{182}_{11}$, and agent $\mathbf{184}_{1M}$ can be implemented in the virtualized controller $\mathbf{182}_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or the agents.

Exemplary Computing System

Figure 2:
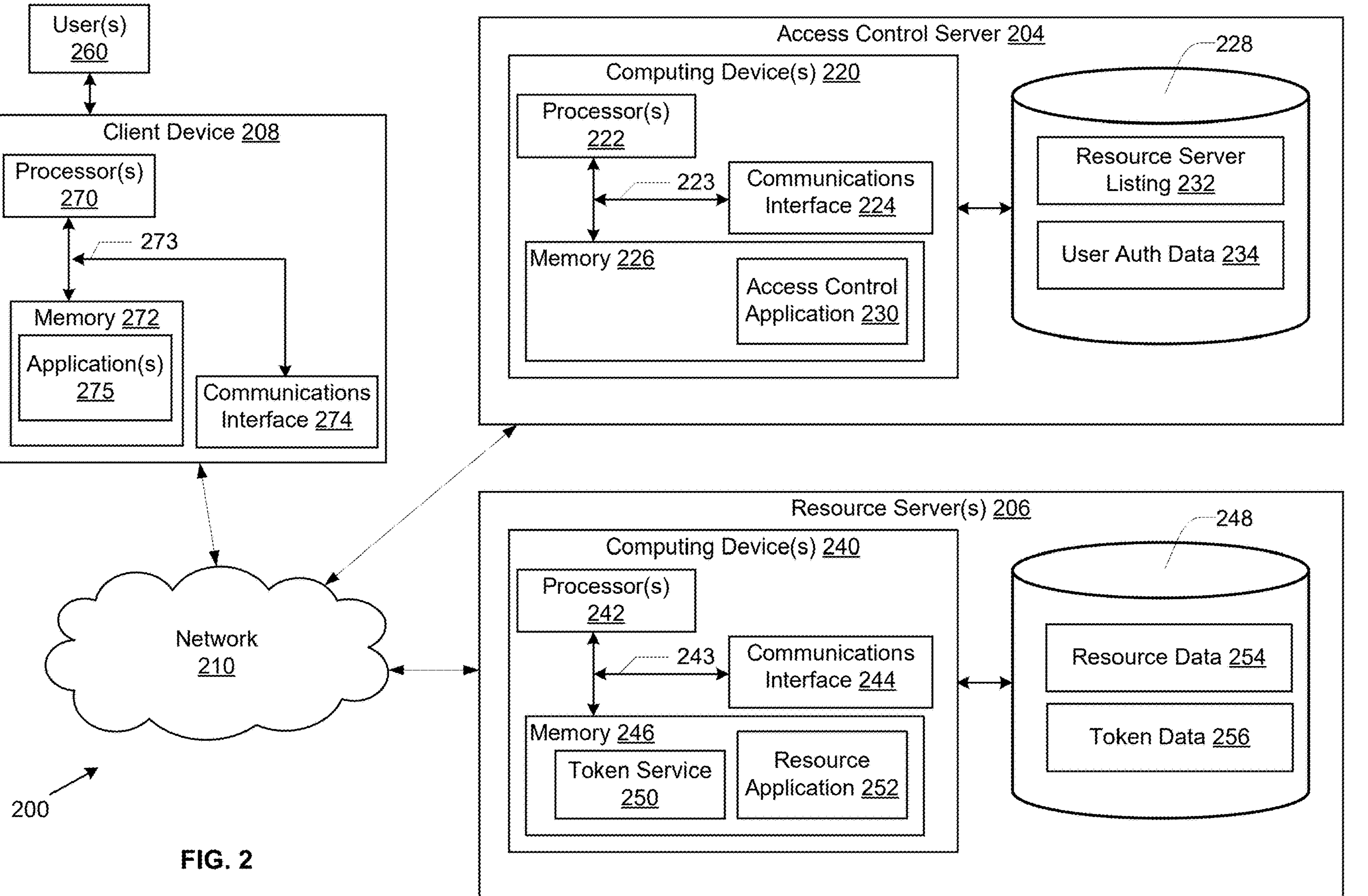
FIG. 2 is a block diagram illustrating a networked environment in which one or more aspects of the present embodiments are implemented.

FIG. 2 is a block diagram illustrating a networked environment 200 in which one or more aspects of the present embodiments are implemented. As shown, networked environment 200 includes, without limitation, an access control server 204, a resource server 206, a client device 208, and a network 210. Access control server 204 includes, without limitation, one or more computing devices 220 and storage 228. Each computing device 220 includes, without limitation, one or more processors 222, memory 226, a bus 223, and a communications interface 224. Memory 226 stores, without limitation, an access control application 230. Storage 228 includes, without limitation, a resource server listing 232 and user authentication data 234. Each computing device 240 includes, without limitation, one or more processors 242, memory 246, a bus 243, and a communications interface 244. Memory 246 stores, without limitation, a token service 250 and resource application 252. Storage 248 includes, without limitation, resource data 254 and token data 256. Client device 208 includes, without limitation, one or more processors 270, memory 272, a bus 273, and a communications interface 274. Memory 272 stores, without limitation, one or more applications 275.

In the context of this disclosure, the computing elements shown in the networked environment 200 can correspond to a physical computing system (e.g., a system in a data center) or can include a virtual computing instance. In various embodiments, networked environment 200 and/or the elements of networked environment 200 can be included in any of the virtualization system architectures shown in FIGS. 1A-1D.

Each of the one or more processors 222, 242, and/or 270 can be any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, one or more processors 222, 242, and/or 270 can be any technically feasible hardware unit capable of processing data and/or executing software applications.

Each of memories 226, 246, and/or 272 can include, without limitation, one or more random-access memory (RAM) modules, flash memory units, any other type of memory unit, or a combination of different memory types. The one or more processors 222, 242, and/or 270 are configured to read data from and write data to respective memories 226, 246, and/or 272. Memories 226, 246, and/or 272 includes various software programs that include one or more instructions that can be executed by the respective one or more processors 222, 242, and/or 270 and application data associated with the software programs.

Each of buses 223, 243, and/or 273 interconnect the subsystems and devices within the corresponding device 220, 240 and/or 208. For example, bus 223 includes a local interface provided by computing device 220 that allows the access control application 230 to communicate with storage 228 within the access control server 204.

Each of communications interfaces 224, 244, and/or 274 includes any technically feasible hardware and/or software allowing respective devices 208, 220, and/or 240 to communicate with external devices, such as storage 228 or 248, network 210, and/or the like. Each of communications interfaces 224, 244, and/or 274 can include one or more input/output interfaces, one or more network interfaces, and/or the like.

Storage 228 and/or 248 includes non-volatile storage for applications and data. Storage 228 and/or 248 can include, without limitation, one or more fixed or removable disk drives, HDDs, SSD, NVMes, vDisks, flash memory devices, and/or other magnetic, optical, and/or solid-state storage devices.

Resource server listing 232 in storage 228 includes a listing of resource servers 206 for which the access control server 204 authenticates and authorizes users. The resource server listing 232 identifies resource servers 206 by an identifier, such as a uniform resource identifier (URI) or a network address and specifies the resources that are stored by the respective resource servers 206. Access control application 230 determines a resource server 206 on which a requested resource is stored using the resource server listing 232. Access control application 230 also determines a network address of the resource server 206 storing a requested resource using the resource server listing 232 so that the network address can be provided to the client device 208 in response to request. Resource server listing 232 can also specify which users or groups of users are authorized to access resources stored by a respective resource server 206.

User authentication data 234 in storage 228 includes authentication data that is used to authenticate and authorize users or client devices 208 requesting resources via the access control server 204. User authentication data 234 includes authentication credentials or other information from which users or client devices 208 requesting resources via the access control application 230 are authenticated. In some implementations, user authentication data 234 specifies which resources a particular user is authorized to access on the one or more resource servers 206.

Network 210 provides communications between client device 208 and computing device(s) 220, 240 in access control server 204 and/or resource server 206. Network 210 can include any technically feasible networks, such as one or more wired, wireless, or cellular networks, one or more local (e.g., an Ethernet) or wide area networks (e.g., the internet), and/or any combination thereof.

When executed by one or more processors 222, access control application 230 performs user authentication and user authorization on behalf of users attempting to access resources stored on the one or more resource servers 206. The access control application 230 can authenticate a user's identity and then determine whether the user, once authenticated, is authorized to access a resource that is being requested by the user via client device 208. For example, a user can request to access a resource, such as a document, website, file, database, or other resource housed on a resource server 206. The user requests the resource using one or more applications 275 on the client device 208. The request is submitted to the access control application 230. The request submitted to access control application 230 includes one or more request parameters that identifies the resource that the user is requesting to access. The access control application 230 determines that the requested resource requires user authentication and user authorization. In other words, the access control application 230 determines that accessing the resource requires authenticating an identity of the user as well as determining whether the user, once authenticated, is authorized to access the requested resource. The resource server listing 232 includes a listing of resources as well as a location of the resource, such as a listing of one or more resource servers 206 from which the requested resource can be retrieved. Additionally, the resource server listing 232 can identify whether user authentication and/or user authorization is needed to access a particular resource. The resource server listing 232 can specify which users, user groups, or classes of users can access certain resources stored on one or more resource servers 206.

Accordingly, the access control application 230 authenticates the user's identity. In one example, the user is presented with a user interface provided by or triggered on the client device 208 by the access control application 230. In the user interface, the user is challenged to provide one or more authentication credentials. The user submits one or more authentication credentials, such as a username, password, passkey, secondary authentication factor, and/or biometric authentication credential, to the access control application 230. The authentication credentials can be submitted in a single request or in a multipart interactive series of challenge-response requests. The authentication credentials can be submitted by one or more applications 275 running on a client device 208 associated with the user. The access control application 230 verifies the provided credentials by consulting user authentication data 234 in storage 228, which stores user credentials associated with users. In some cases, the user has been previously authenticated and does not require re-authentication. For example, the client device 208 can provide a session token previously issued to the client device 208 that is still valid so that the access control application 230 need not challenge the user or client device 208 for authentication credentials.

Once the user's identity is authenticated by verifying the provided authentication credentials or a session token, the access control application 230 determines whether the authenticated user is authorized to access the resource being requested by the user. The access control application 230 determines whether the user is authorized to access the requested resource by consulting one or both of resource server listing 232 and user authentication data 234. For example, user authentication data 234 indicates which resources a particular user or user group is entitled to access. Access control application 230 identifies a user group to which an authenticated user belongs and then determines whether the requested resource is authorized for a user group in which the user is a member.

Once access control application 230 determines that a user is authenticated and authorized to access a requested resource, the access control application 230 requests an authentication token from the resource server 206 on which the requested resource is stored. The access control application 230 identifies the resource server 206 from which the requested resource can be retrieved from the resource server listing 232. The access control application 230 then requests the authentication token from the identified resource server 206. The request for the authentication token is transmitted to token service 250 running on the identified resource server 206. The request for the authentication token includes request parameters that identify the resource requested by the user as well as a client device 208 or a user making the request. In response to receiving the request for a resource stored on resource server 206, token service 250 generates an authentication token. The authentication token can be an access token, such as a JSON Web Token (JWT), a one-time password, or any other type of token. The authentication token includes the request parameters and is signed by token service 250 using a key or certificate associated with the resource server 206. Because the authentication token includes the request parameters, the authentication token is specific to the client device 208 from which the request was submitted to the access control application 230. Token service 250 returns the signed authentication token to the access control application 230. In some examples, token service 250 stores information in token data 256 with which the authentication token can be later validated. Token data 256 can include a copy of the authentication token or a token signature from which the authentication token can be validated when the authentication token is later presented to resource server 206.

Access control application 230 returns, to client device 208, the signed authentication token generated by token service 250 along with identifying information of the resource server 206 from which the requested resource can be retrieved. The identifying information of the resource server 206 includes a network address of resource server 206, a port number, or other information that one or more applications 275 running on client device 208 can utilize to retrieve the resource directly from the resource server 206 without further interaction between client device 208 and access control server 204.

One or more applications 275 running on client device 208 can then submit a request for the resource to resource server 206. In some embodiments, an application 275 submits the request to the resource server 206 using an API call or a remote procedure call. The request is submitted to resource application 252 running on resource server 206. The request from the client device 208 for the resource includes the authentication token generated and signed by token service 250 that was provided by access control application 230 to client device 208. The request from client device 208 also includes request parameters that identify the resource that the client device 208 is requesting from the resource server 206 on behalf of a user. Resource application 252 validates the authentication token included in the request using token data 256. For example, resource application 252 validates that the authentication token was signed using a certificate or private key associated with the resource server 206. The resource application 252 also validates that the request parameters included in the request match the request parameters embedded in the authentication token that was previously generated by token service 250 and provided to the client device 208 by access control application 230. The resource application 252 validates the request parameters by requesting that the token service 250 validate the parameters against the authentication token submitted in the request from the client device 208. Because the request parameters are embedded in the authentication token, a malicious user cannot alter the request parameters in the request and gain access to a resource other than the resource for which the user or client device 208 was initially authorized by the access control server 204. In response to validating the authentication token and that the request parameters match the request parameters included in the authentication token, the resource application 252 provides the requested resource to the client device 208. In one example, resource application 252 retrieves the resource from resource data 254 in storage 248 and transmits the resource to client device 208. The requested resource can include documents, files, database query results, or any other information that is stored in storage 248.

When executed by one or more processors 242, token service 250 generates authentication tokens when requested by access control application 230. As noted above, access control application 230 requests authentication tokens on behalf of users that are authenticated and authorized for a requested resource by access control application 230. A request for an authentication token from the access control application 230 includes the request parameters identifying the requested resource. In one example, token service 250 generates an authentication token that includes a payload storing the request parameters along with an identifier corresponding to a user or client device 208 for whom the authentication token is requested. The token service 250 also signs the authentication token using a certificate or key corresponding to the resource server 206. The token service 250 returns the authentication token to the access control server 204. Because the authentication token is generated and signed in resource server 206, the access control server 204 need not have further involvement in providing the requested resource to a client device 208.

When executed by one or more processors 242, resource application 252 receives requests from one or more applications 275 running on a client device 208 for resources stored in one or more resource servers 206 on behalf of users. As noted above, such a request includes an authentication token previously generated by token service 250 and provided to the client device 208 by access control application 230 after access control application 230 authenticates a user identity and authorizes the user's access to the requested resource. Accordingly, resource application 252 validates an authentication token received in a request from a client device 208. Resource application 252 validates that the authentication token was signed by token service 250. In one example, resource application 252 validates a token signature generated by token service 250 when the authentication token was initially generated and signed that is stored in token data 256. In another example, token service 250 signs the authentication token with a private key when the authentication token was generated, and the resource application 252 validates the signature with a corresponding public key. In another example, resource application 252 compares the signed authentication token received from client device 208 with a copy of the authentication token stored in resource application 252. In another example, the resource application 252 requests the token service 250 to validate authentication token embedded in a request from a client device 208.

In addition to validating a signature associated with the authentication token received from client device 208, resource application 252 also validates that the request parameters included in the request are consistent with request parameters embedded in the authentication token. The request parameters included in the request identify the resource that client device 208 is requesting from the resource application 252. In some cases, the request parameters also identify a user or client device 208 requesting the parameters. If the request parameters embedded in the request are different from the request parameters embedded in the authentication token included in the request, the resource application 252 denies the request and does not provide the client device 208 with the requested resource. If the request parameters embedded in the request match the request parameters embedded in the authentication token, the resource application 252 provides the requested resource from resource data 254 to the client device 208.

When executed by one or more processors 270, one or more applications 275 request resources via the access control server 204. For example, an application 275 running on client device 208 submits a request for a particular resource, such as a document, page, file, database, and/or the like, from access control application 230 executed by access control server 204. The request includes one or more request parameters that identifies the requested resource. In some cases, the request includes a user identifier or an identifier of the client device 208. Access control server 204 authenticates the user based upon the request parameters or issues a challenge to the application 275 for more information, such as one or more authentication credentials. As noted above, access control server 204 also determines whether the user or client device 208 is authorized to access the requested resource. Assuming the user or client device 208 is authenticated and authorized by the access control application 230, the application 275 receives an authentication token signed by the resource server 206 from access control application 230. The application 275 also receives an identity of the resource server 206 from which the resource can be retrieved by the client device 208. For example, the identity of the resource server 206 includes a network address, port number, protocol, or other information that the application 275 utilizes to request and retrieve the resource directly from the resource server 206.

Application 275 then requests the resource directly from the resource server 206. The request from application 275 includes the authentication token generated by the token service 250 and signed by the token service 250 on behalf of the resource server 206. The request also includes request parameters. The request parameters identify the resource that is requested by the application 275. In some cases, the request includes an identifier corresponding to the client device 208 and/or a user identifier. The resource application 252 validates the authentication token along with the request parameters and provides the requested resource from communications interfaces 274 to the application 275.

Figure 3:
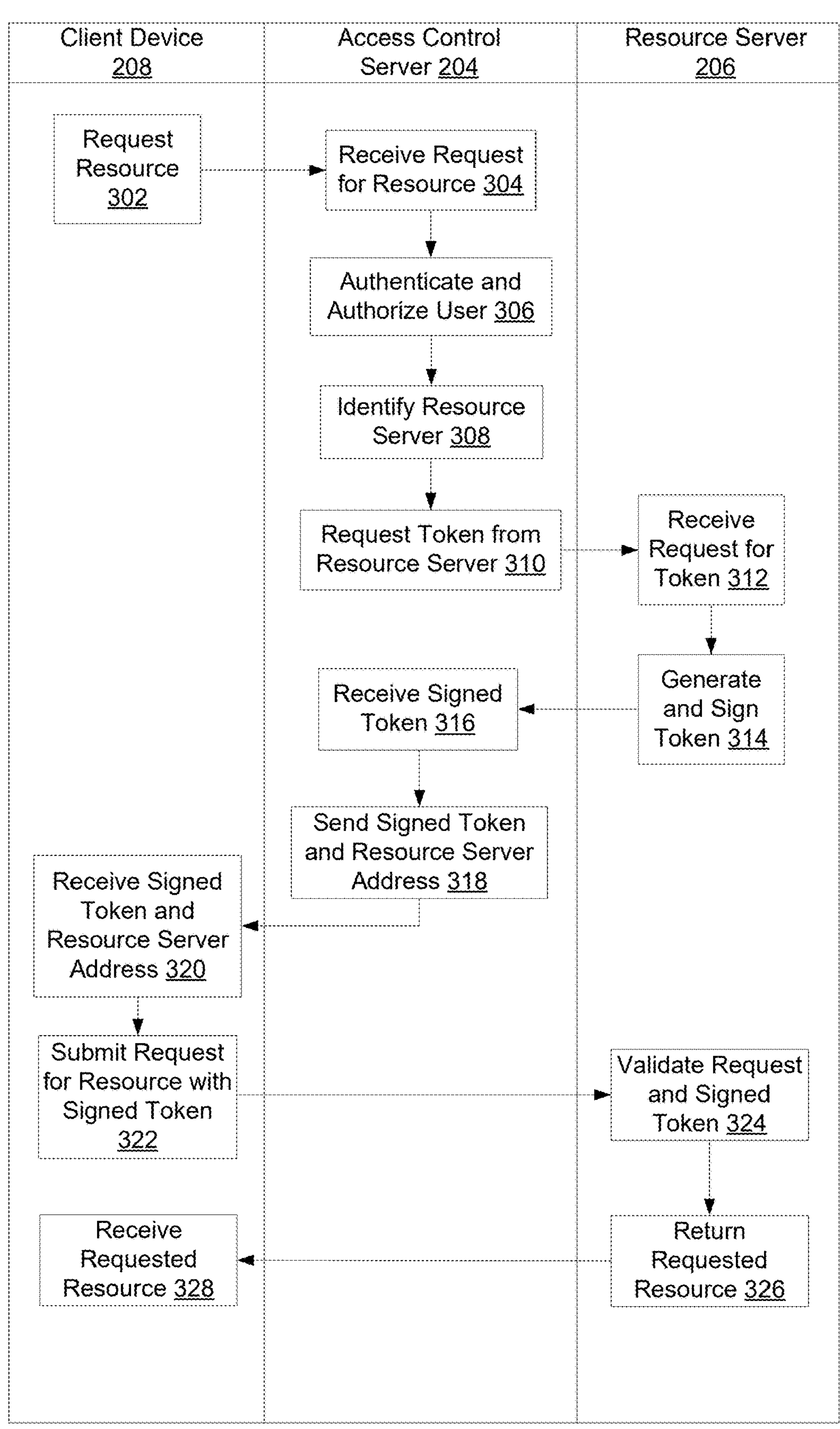
FIG. 3 is an interaction diagram showing a client device requesting a resource from an access control server and then receiving the requested resource from a resource server according to one or more aspects of the present embodiments.

FIG. 3 is an interaction diagram showing a client device 208 requesting a resource from an access control server 204 and then receiving the requested resource from a resource server 206 according to embodiments of the disclosure. As shown in FIG. 3, at step 302, client device 208 requests a resource from access control server 204. The request includes one or more request parameters that identify the requested resource and an identity of a user or the client device 208. Correspondingly, at step 304, the access control server 204 receives the request to access the resource from the client device 208. The request to access the resource is received by access control application 230 running on the access control server 204.

At step 306, access control application 230 authenticates and authorizes the user. The access control application 230 authenticates an identity of a user or the client device 208 from which the request is received. As noted above, the access control application 230 performs user authentication by verifying one or more authentication credentials based upon user authentication data 234 in storage 228. If the user cannot be authenticated, the request is rejected or denied by returning an authentication error to client device 208. Assuming the user is authenticated by the access control application 230, the access control application 230 then determines whether the user is authorized to access the resource identified in the request parameters. The access control application 230 can determine whether the user is authorized based upon whether the resource server listing 232 or user authentication data 234 in storage 228 indicates that the user is authorized to access the resource.

At step 308, access control application 230 identifies a resource server 206 from which the requested resource is accessible. Access control application 230 consults the resource server listing 232 to identify which resource server 206 stores the requested resource. For example, the resource server listing 232 identifies the resource server 206 with a network address or other identifier.

At step 310, access control application 230 requests an authentication token from the resource server 206 identified in step 308. The request for the authentication token includes the request parameters received from the client device 208 at step 304, which includes one or more identifiers associated with a user or the client device 208 as well as one or more identifiers associated with the requested resource. At step 312, the resource server 206 receives the request for the authentication token. The request for the authentication is received by token service 250 running on the resource server 206.

In response to receiving the request to generate an authentication token, token service 250 running on the resource server 206 generates an authentication token. The authentication token can be an access token, such as a JWT, a one-time password, or any other type of token. Within the authentication token, token service 250 embeds the request parameters received from access control application 230. Additionally, token service 250 signs the generated authentication token. A token signature, a copy of the authentication token, or any other metadata associated with the authentication token is saved in token data 256 in storage 248 for later access by resource application 252 on the resource server 206. By embedding the request parameters into and signing the authentication token, resource application 252 can later validate the token without further interaction with the access control application 230. Token service 250 then returns the signed authentication token to access control application 230.

At step 316, access control application 230 receives the signed authentication token from token service 250. Next, at step 318, access control application 230 returns the signed authentication token and an identity of the resource server 206 from which the resource can be accessed to the client device 208. The identity of the resource server 206 can be provided as a network address or URI associated with the resource server 206. Correspondingly, at step 320, client device 208 receives the signed authentication token along with the identity of the resource server 206.

At step 322, the client device 208, or an application 275 running on the client device 208, submits a request for the resource to the resource server 206 at the network address received from the access control application 230 at step 320. The request includes request parameters that identify the resource being requested from the resource server 206. The resource can be identified in the request parameters using the same identifier that was included in the request submitted to access control application 230. The request also includes the authentication token provided to the client device 208 at step 320. In some examples, the request parameters include an identity of a user or the client device 208 making the request to the resource server 206. The identity of the user or client device 208 can include a user or device identifier.

At step 324, resource server 206 receives the request from the client device 208. The request is received by resource application 252 running on resource server 206. Resource application 252 validates the request parameters in the request along with the signed authentication token. Resource application 252 validates the signed authentication token by verifying the signature of the token. Additionally, resource application 252 identifies the request parameters embedded into the authentication token and validates that the request parameters included in the request from the access control server 204 match the request parameters embedded into the authentication token. In one example, resource application 252 validates that the requested resource in the request parameters of the request is the same as the requested resource embedded into the authentication token. Additionally, the resource application 252 can also validate that a user identifier or device identifier embedded into the authentication token matches a user identifier or device identifier in the request parameters associated with the request from the client device 208. If the authentication token cannot be validated or if the request parameters fail to match the request parameters embedded into the authentication token, resource server 206 denies the request or refuses to provide the requested resource.

At step 326, if the authentication token and the request parameters included in the request are validated by resource application 252, resource application 252 transmits the requested resource from resource data 254 to the client device 208. Correspondingly, as step 328, client device 208 receives the requested resource from resource application 252.

Figure 4:
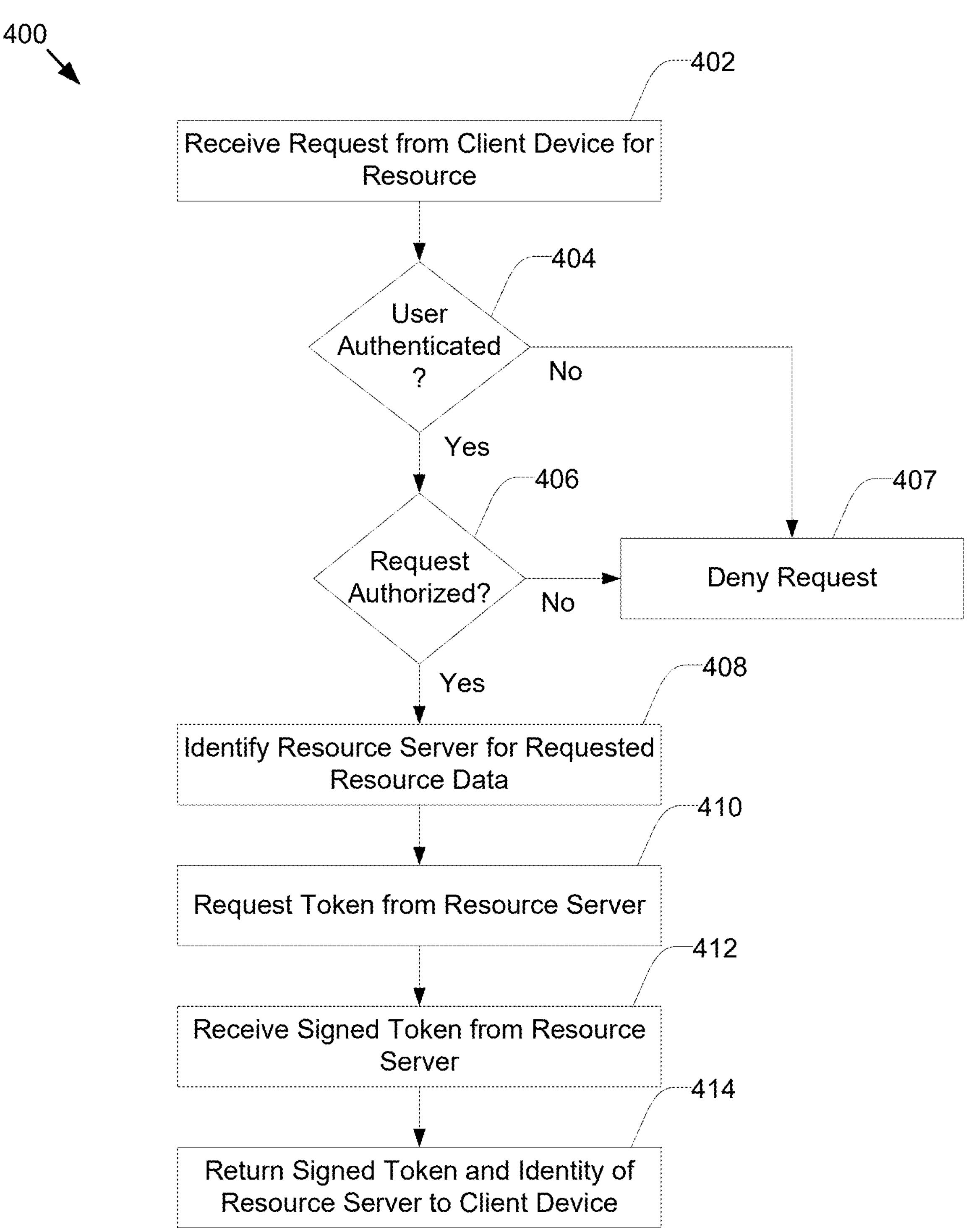
FIG. 4 is a flow diagram illustrating an example method for providing an authentication token using an access control server according to one or more aspects of the present embodiments.

FIG. 4 is a flow diagram illustrating an example method for providing an authentication token using an access control server 204 according to one or more aspects of the present embodiments. Although the method steps are described in conjunction with FIGS. 1A-3, persons skilled in the art will understand that any system configured to perform the method steps, in any order, falls within the scope of the present invention. The method 400 of FIG. 4 can be implemented by access control application 230. In the discussion of FIG. 4, a non-limiting illustrative discussion is presented with respect to access control application 230 performing the steps of the method.

As shown in FIG. 4, the method 400 begins at step 402, where access control application 230 receives a request for a resource from client device 208. The request includes one or more request parameters that identify the requested resource and an identity of a user or the client device 208. The requested resource can be identified by a URI or other identifier that identifies the resource.

At step 404, access control application 230 authenticates the user. Access control application 230 can challenge the client device 208 or the user for one or more authentication credentials. The user or client device 208 provides one or more authentication credentials in response to the challenge. Access control application 230 can authenticate the provided credentials against user authentication data 234 in storage 228. In some cases, the user has been previously authenticated and does not require re-authentication. For example, client device 208 can provide a session token that is still valid so that the access control application 230 need not challenge the user or client device 208 for authentication credentials. If the access control application 230 is unable to authenticate the user or client device 208, the method proceeds to step 407, where access control application 230 denies the request for the resource. In one example, access control application 230 provides an error message to the client device 208. If access control application 230 is able to authenticate the user's identity, the method proceeds from step 404 to step 406.

At step 406, access control application 230 determines whether the user is authorized to access the requested resource. The access control application 230 can determine whether the user is authorized based upon whether the resource server listing 232 or user authentication data 234 in storage 228 indicates that the user is authorized to access the resource. In some cases, the resource server listing 232 or user authentication data 234 identifies user groups or classes of users that are authorized to access certain resources rather than identifying authorized users by individual user identifiers. If the access control application 230 is unable to authorize the user's access to the requested resource, the method proceeds to step 407, where access control application 230 denies the request for the resource. In one example, access control application 230 provides an error message to the client device 208. If access control application 230 is able to authorize the user's access to the requested resource, the method proceeds from step 406 to step 408.

At step 408, access control application 230 identifies a resource server 206 from which the requested resource can be retrieved by the client device 208. Access control application 230 consults the resource server listing 232 to identify which resource server 206 stores the requested resource. For example, the resource server listing 232 identifies the resource server 206 with a network address or other identifier.

At step 410, access control application 230 requests an authentication token from the resource server 206 identified in step 408. The request for the authentication token includes the request parameters received from the client device 208 at step 402, which includes one or more identifiers associated with a user or the client device 208 as well as one or more identifiers associated with the requested resource. The request for the authentication is submitted to token service 250 running on the resource server 206.

At step 412, access control application 230 receives a signed authentication token from token service 250. The authentication token includes the one or more of the request parameters received in the request at step 402. Additionally, the authentication token is signed by token service 250 on behalf of the resource server 206 from which the resource can be retrieved from the client device 208.

At step 414, access control application 230 returns the signed authentication token and an identity of the resource server 206 from which the resource can be retrieved to the client device 208. The identity of the resource server 206 is provided as a uniform resource identifier, network address, or IP address of the resource server 206. In some cases, the identity of the resource server 206 is provided in the form of a uniform resource locator redirect. Once access control application 230 provides the signed authentication token and identity of the resource server 206 to the client device 208, access control server 204 need not have further involvement in providing the resource to the client device 208. Instead, client device 208 and resource server 206 can subsequently communicate to provide the requested resource to the client device 208.

Figure 5:
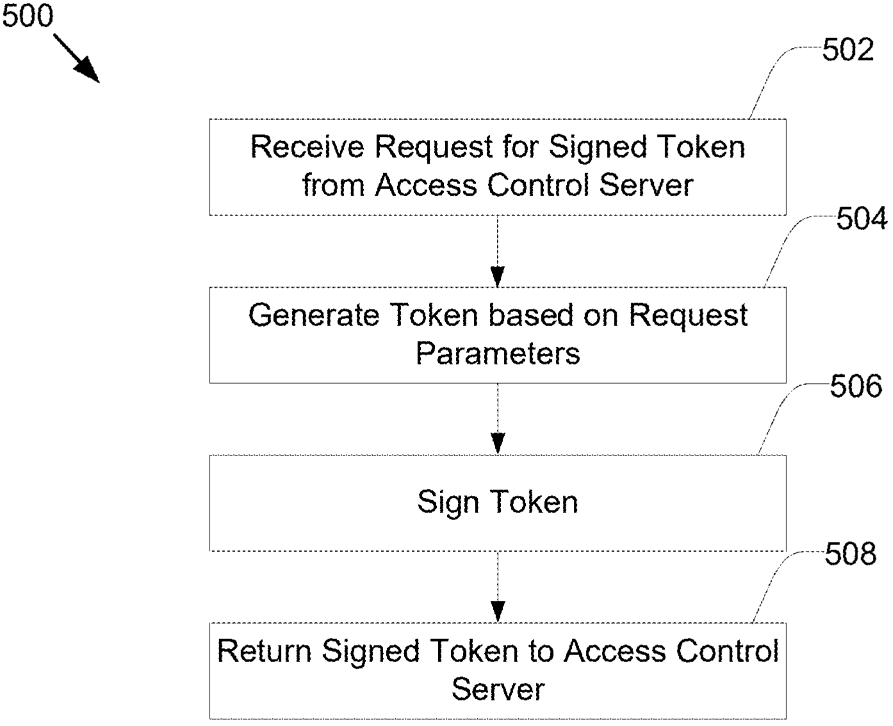
FIG. 5 is a flow diagram illustrating an example method for providing an authentication token using a resource server according to one or more aspects of the present embodiments.

FIG. 5 is a flow diagram illustrating an example method for providing an authentication token using a resource server 206 according to one or more aspects of the present embodiments. Although the method steps are described in conjunction with FIGS. 1A-3, persons skilled in the art will understand that any system configured to perform the method steps, in any order, falls within the scope of the present invention. The method 500 of FIG. 5 can be implemented by token service 250. In the discussion of FIG. 5, a non-limiting illustrative discussion is presented with respect to token service 250 performing the steps of the method.

As shown in FIG. 5, the method 500 begins at step 502, where token service 250 receives the request for the authentication token from access control server 204. The request from access control server 204 includes request parameters received by access control server 204 from a client device 208 or user. The request parameters include the identity of one or more resources requested by a user or client device 208. The request parameters further include a user or device identifier.

At step 504, the token service 250 generates an authentication token. As noted above, authentication token can be an access token, such as a JWT, a one-time password, or any other type of token. Additionally, within the authentication token, token service 250 embeds the request parameters received from access control application 230.

At step 506, token service 250 signs the generated authentication token. A token signature, a copy of the authentication token, or any other metadata associated with the authentication token is saved in token data 256 in storage 248 for later access by resource application 252 on the resource server 206. By embedding the request parameters and signing the authentication token, resource application 252 can later validate the token without further interaction with the access control application 230. At step 508, token service 250 returns the signed authentication token to access control application 230.

Figure 6:
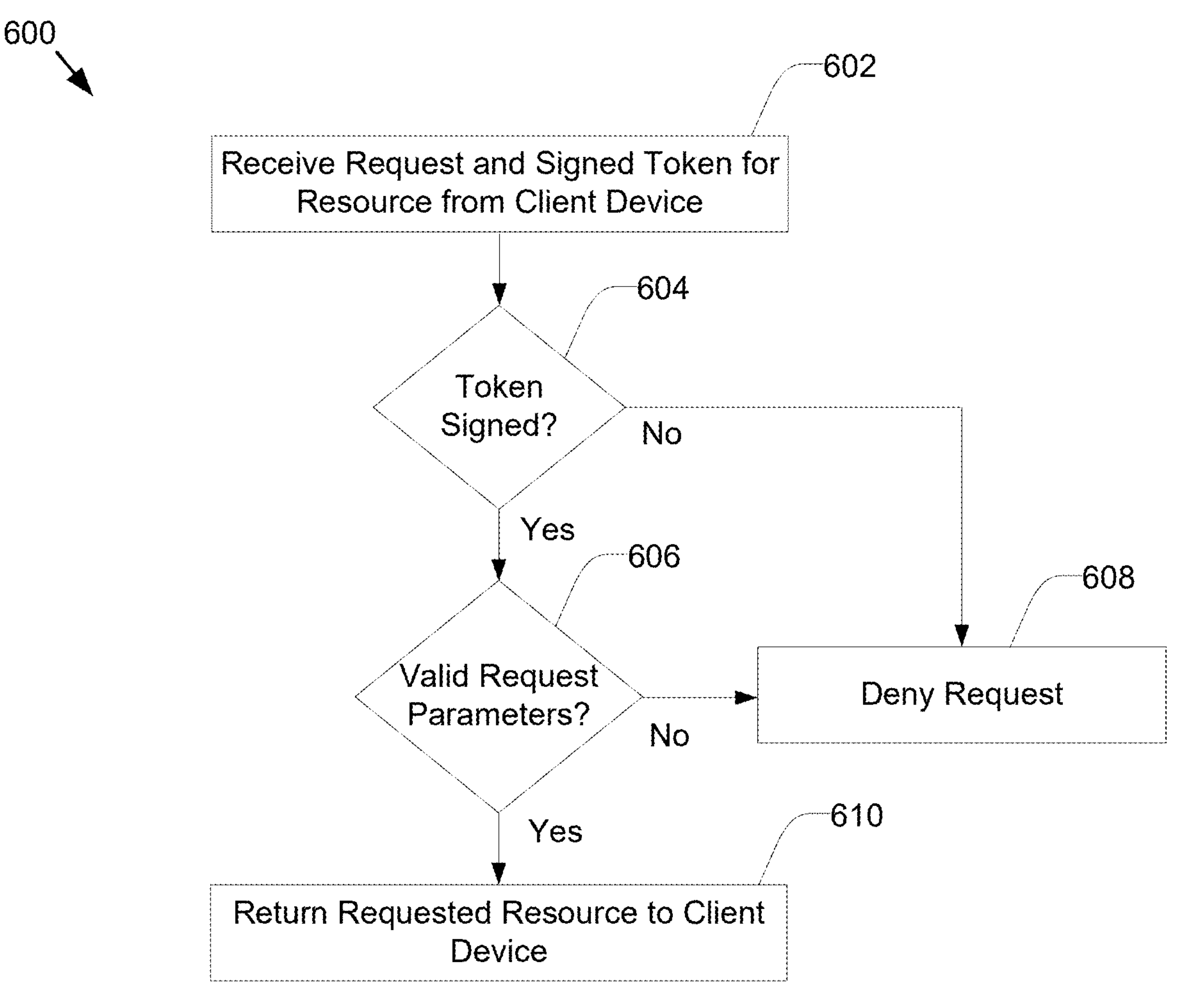
FIG. 6 is a flow diagram illustrating an example method for returning a requested resource to a client device according to one or more aspects of the present embodiments.

FIG. 6 is a flow diagram illustrating an example method for returning a requested resource to a client device 208 according to one or more aspects of the present embodiments. Although the method steps are described in conjunction with FIGS. 1A-3, persons skilled in the art will understand that any system configured to perform the method steps, in any order, falls within the scope of the present invention. The method 600 of FIG. 6 can be implemented by resource application 252. In the discussion of FIG. 6, a non-limiting illustrative discussion is presented with respect to token service 250 performing the steps of the method 600.

At step 602, resource application 252 receives a request for a resource stored on the resource server 206 from the client device 208. The request from the client device 208 for the resource includes the authentication token generated and signed by token service 250 that is provided by access control application 230 to client device 208. The request from client device 208 also includes request parameters that identify the resource that the client device 208 is requesting on behalf of a user from the resource server 206.

At step 604, resource application 252 determines whether the authentication token has a valid signature. Resource application 252 validates the signed authentication token by verifying the signature of the token. In one example, the token signature can be verified based on token data 256 or using a public key corresponding to a private key used to sign the authentication token by token service 250. If resource application 252 cannot validate the signature of the authentication token, the process proceeds to step 608, where resource application 252 denies the request from the client device 208. In one example, resource application 252 returns an error message to client device 208. If resource application 252 can validate the signature of the authentication token, the method 600 proceeds to step 606.

At step 606, resource application 252 determines whether the request parameters in the request are valid. To validate the request parameters in the request, resource application 252 determines whether the request parameters in the request received from client device 208 match the request parameters embedded into the authentication token. In one example, resource application 252 validates that the requested resource in the request parameters of the request is the same as the requested resource embedded into the authentication token. Additionally, the resource application 252 can also validate that a user identifier or device identifier embedded into the authentication token matches a user identifier or device identifier in the request parameters associated with the request from the client device 208. If the signature of the token cannot be validated or if the request parameters fail to match the request parameters embedded into the authentication token, the method 600 proceeds to step 608, where resource application 252 denies the request or returns an error message to client device 208. If resource application 252 validates the request parameters, method 600 proceeds to step 610.

At step 610, if the authentication token and the request parameters included in the request are validated by resource application 252, resource application 252 returns the requested resource to the client device 208. The requested resource is obtained by resource application 252 from resource data 254 and transmitted to client device 208 from which the request received at step 602 originated.

Figure 7:
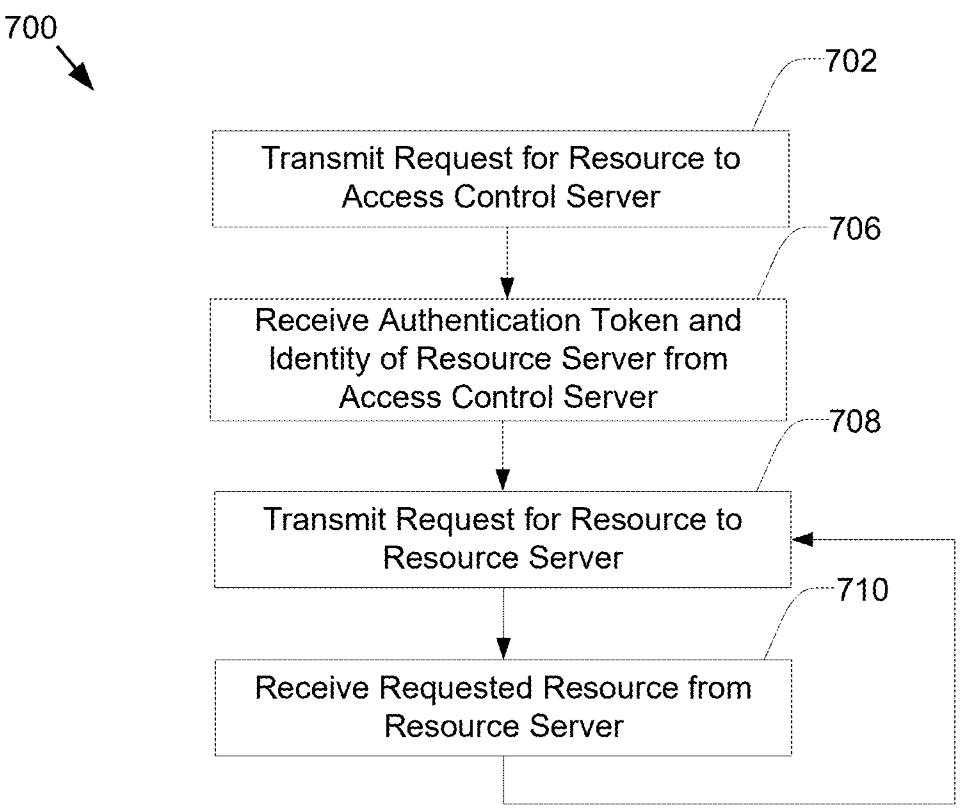
FIG. 7 is a flow diagram illustrating an example method for requesting a resource using a client device according to one or more aspects of the present embodiments.

FIG. 7 is a flow diagram illustrating an example method for requesting a resource using a client device 208 according to one or more aspects of the present embodiments. Although the method steps are described in conjunction with FIGS. 1A-3, persons skilled in the art will understand that any system configured to perform the method steps, in any order, falls within the scope of the present invention. The method 700 of FIG. 7 can be implemented by one or more applications 275. In the discussion of FIG. 7, a non-limiting illustrative discussion is presented with respect to an application 275 performing the steps of the method 700.

At step 702, application 275 transmits a request for a resource to access control server 204. The request for the resource includes request parameters, such as an identity of the resource. The resource can be identified in the request parameters by a URI or other identifier. For example, application 275 can use an API or remote procedure call of access control server 204 to transmit the request for the resource to access control server 204.

At step 706, application 275 receives an authentication token and an identity of the resource server 206 from access control server 204. The authentication token is obtained by the access control server 204 from token service 250 running on a resource server 206 from which the resource can be obtained.

At step 708, application 275 transmits a request for the resource to the resource server 206 identified at step 706. The request is submitted to resource application 252 running on access control server 204. The request includes requests parameters identifying the resource being requested as well as the authentication token received from access control server 204 at step 706.

At step 710, application 275 receives the requested resource from resource server 206. As described above, the resource application 252 and token service 250 validate the request parameters and authentication token included in the request submitted by application 275 to resource server 206. In response to validating the request parameters and authentication token, the resource server 206 returns the requested resource to application 275 running on client device 208. From step 710, method 700 returns to step 708, where application 275 can subsequently request the resource from resource server 206 using the authentication token and identifying information about resource server 206 without further involvement of access control server 204.

In sum, the disclosed techniques facilitate user access to a resource stored on a resource server, where access to the resource is authenticated and authorized through an access control server. The disclosed techniques include receiving, from a client device, a first request for an authentication token to access a resource and identifying a second computing device through which the resource is accessible. The disclosed techniques also include transmitting a second request to the second computing device for the authentication token, receiving a signed authentication token from the second computing device, wherein the authentication token is signed by the second computing device and specific to the client device, and providing the signed authentication token to the client device. The disclosed techniques further include receiving a request in the second computing device to generate an authentication token from the first computing device, where the request includes request parameters. The second computing device generates the authentication token using the request parameters and signs the authentication token. The signed authentication token is returned to the first computing device. The disclosed techniques additionally include receiving a request for a resource in the second computing device from a client device. The request includes request parameters along with the authentication token. The second computing device returns the requested resource to the client device in response to validating the request parameters and the authentication token.

At least one technical advantage of the disclosed techniques relative to the prior art is that, with the disclosed techniques, an access control server performs user authentication and authorization. The resource control server can then provide a requested resource to a client device without requiring the access control server to further validate the user. Additionally, the resource control server can provide the requested resource directly to the client device without having to provide the requested resource through the access control server. The use of the disclosed techniques improves scalability in distributed storage systems because the access control server is not required to fetch data from the resource server and provide the requested data to client devices, thereby removing a potential bottleneck in distributed storage systems. Additionally, the access control server is not required to validate or authenticate a client device for every resource request assuming the client device presents an authentication token that can be validated by the resource server. Also, the disclosed techniques reduce implementation complexity by removing the need for a federated authentication deployment that requires a key exchange between an access control server and resource servers from which data is retrieved by client devices. These technical advantages provide one or more technological improvements over prior art approaches.

1. In some embodiments, one or more non-transitory computer-readable media store program instructions that, when executed by one or more processors associated with a first computing device, cause the one or more processors to perform a method comprising receiving, from a client device, a first request for an authentication token to access a resource, identifying a second computing device through which the resource is accessible, transmitting a second request to the second computing device for the authentication token, receiving a signed authentication token from the second computing device, wherein the authentication token is signed by the second computing device and specific to the client device, and providing the signed authentication token to the client device.

2. The one or more non-transitory computer-readable media of clause 1, wherein the first request from the client device comprises a first plurality of request parameters authenticated by the first computing device, the first plurality of request parameters including one or more of an identity of the client device or a user, an address of the second computing device, or the resource.

3. The one or more non-transitory computer-readable media of clauses 1 or 2, wherein the client device transmits the signed authentication token and a third request to the second computing device to access the resource.

4. The one or more non-transitory computer-readable media of any of clauses 1-3, wherein the client device obtains the resource directly from the second computing device in response to the second computing device validating the signed authentication token and the third request.

5. The one or more non-transitory computer-readable media of any of clauses 1-4, wherein the resource provided to the client device is not provided to the first computing device.

6. The one or more non-transitory computer-readable media of any of clauses 1-5, wherein a second plurality of request parameters are embedded into the signed authentication token by the second computing device.

7. The one or more non-transitory computer-readable media of any of clauses 1-6, wherein validating the signed authentication token and the third request comprises verifying that the second plurality of request parameters matches a third plurality of request parameters embedded in the third request.

8. The one or more non-transitory computer-readable media of any of clauses 1-7, further comprising authenticating a user associated with the client device.

9. The one or more non-transitory computer-readable media of any of clauses 1-8, further comprising determining that the first request is authorized by verifying that the user is authorized to access the resource being requested.

10. The one or more non-transitory computer-readable media of any of clauses 1-9, wherein the first computing device provides an address of the second computing device to the client device along with the signed authentication token.

11. In some embodiments, a computer-implemented method comprises receiving, in a first computing device from a client device, a first request for an authentication token to access a resource, identifying a second computing device through which the resource is accessible, transmitting a second request to the second computing device for the authentication token, receiving a signed authentication token from the second computing device, wherein the authentication token is signed by the second computing device and specific to the client device, and providing the signed authentication token to the client device.

12. The computer-implemented method of clause 11, wherein the first request from the client device comprises a first plurality of request parameters authenticated by the first computing device, the first plurality of request parameters including one or more of an identity of the client device or a user, an address of the second computing device, or the resource.

13. The computer-implemented method of clauses 11 or 12, wherein the client device transmits the signed authentication token and a third request to the second computing device to access the resource.

14. The computer-implemented method of any of clauses 11-13, wherein the client device obtains the resource directly from the second computing device in response to the second computing device validating the signed authentication token and the third request.

15. The computer-implemented method of any of clauses 11-14, wherein the resource provided to the client device is not provided to the first computing device.

16. The computer-implemented method of any of clauses 11-15, wherein a second plurality of request parameters are embedded into the signed authentication token by the second computing device.

17. The computer-implemented method of any of clauses 11-16, wherein validating the signed authentication token and the third request comprises verifying that the second plurality of request parameters matches a third plurality of request parameters embedded in the third request.

18. The computer-implemented method of any of clauses 11-17, further comprising authenticating a user associated with the client device.

19. The computer-implemented method of any of clauses 11-18, further comprising determining that the first request is authorized by verifying that the user is authorized to access the resource being requested.

20. The computer-implemented method of any of clauses 11-19, wherein the first computing device provides an address of the second computing device to the client device along with the signed authentication token.

21. In some embodiments, a system comprises a first computing device, memory storing instructions, and one or more processors coupled to the memory and, when executing the instructions, are configured to perform operations comprising receiving, from a client device, a first request for an authentication token to access a resource, identifying a second computing device through which the resource is accessible, transmitting a second request to the second computing device for the authentication token, receiving a signed authentication token from the second computing device, wherein the authentication token is signed by the second computing device and specific to the client device, and providing the signed authentication token to the client device.

22. The system of clause 21, wherein the first request from the client device comprises a first plurality of request parameters authenticated by the first computing device, the first plurality of request parameters including one or more of an identity of the client device or a user, an address of the second computing device, or the resource.

23. The system of clauses 21 or 22, wherein the client device transmits the signed authentication token and a third request to the second computing device to access the resource.

24. The system of any of clauses 21-23, wherein the client device obtains the resource directly from the second computing device in response to the second computing device validating the signed authentication token and the third request.

25. The system of any of clauses 21-24, wherein the resource provided to the client device is not provided to the first computing device.

26. The system of any of clauses 21-25, wherein a second plurality of request parameters are embedded into the signed authentication token by the second computing device.

27. The system of any of clauses 21-26, wherein validating the signed authentication token and the third request comprises verifying that the second plurality of request parameters matches a third plurality of request parameters embedded in the third request.

28. The system of any of clauses 21-27, further comprising authenticating a user associated with the client device.

29. The system of any of clauses 21-28, further comprising determining that the first request is authorized by verifying that the user is authorized to access the resource being requested.

30. The system of any of clauses 21-29, wherein the first computing device provides an address of the second computing device to the client device along with the signed authentication token.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors associated with a first computing device, cause the one or more processors to perform a method comprising:

receiving, from a client device, a first request for an authentication token to access a resource;

identifying a second computing device through which the resource is accessible;

transmitting a second request to the second computing device for the authentication token;

receiving a signed authentication token from the second computing device, wherein the authentication token is signed by the second computing device and specific to the client device; and providing the signed authentication token to the client device, wherein the signed authentication token is usable by the client device to access the resource directly from the second computing device.

2. The one or more non-transitory computer-readable media of claim 1, wherein the first request from the client device comprises a first plurality of request parameters authenticated by the first computing device, the first plurality of request parameters including one or more of an identity of the client device or a user, an address of the second computing device, or the resource.

3. The one or more non-transitory computer-readable media of claim 1, wherein the client device transmits the signed authentication token and a third request to the second computing device to access the resource.

4. The one or more non-transitory computer-readable media of claim 3, wherein the client device obtains the resource directly from the second computing device in response to the second computing device validating the signed authentication token and the third request.

5. The one or more non-transitory computer-readable media of claim 4, wherein the resource provided to the client device is not provided to the first computing device.

6. The one or more non-transitory computer-readable media of claim 4, wherein a second plurality of request parameters are embedded into the signed authentication token by the second computing device.

7. The one or more non-transitory computer-readable media of claim 6, wherein validating the signed authentication token and the third request comprises verifying that the second plurality of request parameters matches a third plurality of request parameters embedded in the third request.

8. The one or more non-transitory computer-readable media of claim 1, further comprising authenticating a user associated with the client device.

9. The one or more non-transitory computer-readable media of claim 8, further comprising determining that the first request is authorized by verifying that the user is authorized to access the resource being requested.

10. The one or more non-transitory computer-readable media of claim 1, wherein the first computing device provides an address of the second computing device to the client device along with the signed authentication token.

11. A computer-implemented method comprising:

receiving, in a first computing device from a client device, a first request for an authentication token to access a resource;

identifying a second computing device through which the resource is accessible;

transmitting a second request to the second computing device for the authentication token;

receiving a signed authentication token from the second computing device, wherein the authentication token is signed by the second computing device and specific to the client device; and providing the signed authentication token to the client device, wherein the signed authentication token is usable by the client device to access the resource directly from the second computing device.

12. The computer-implemented method of claim 11, wherein the first request from the client device comprises a first plurality of request parameters authenticated by the first computing device, the first plurality of request parameters including one or more of an identity of the client device or a user, an address of the second computing device, or the resource.

13. The computer-implemented method of claim 11, wherein the client device transmits the signed authentication token and a third request to the second computing device to access the resource.

14. The computer-implemented method of claim 13, wherein the client device obtains the resource directly from the second computing device in response to the second computing device validating the signed authentication token and the third request.

15. The computer-implemented method of claim 14, wherein the resource provided to the client device is not provided to the first computing device.

16. The computer-implemented method of claim 14, wherein a second plurality of request parameters are embedded into the signed authentication token by the second computing device.

17. The computer-implemented method of claim 16, wherein validating the signed authentication token and the third request comprises verifying that the second plurality of request parameters matches a third plurality of request parameters embedded in the third request.

18. The computer-implemented method of claim 11, further comprising authenticating a user associated with the client device.

19. The computer-implemented method of claim 18, further comprising determining that the first request is authorized by verifying that the user is authorized to access the resource being requested.

20. The computer-implemented method of claim 11, wherein the first computing device provides an address of the second computing device to the client device along with the signed authentication token.

21. A system comprising:
a first computing device;
memory storing instructions; and
one or more processors coupled to the memory and, when executing the instructions, are configured to perform operations comprising:
receiving, from a client device, a first request for an authentication token to access a resource;
identifying a second computing device through which the resource is accessible;
transmitting a second request to the second computing device for the authentication token;
receiving a signed authentication token from the second computing device, wherein the authentication token is signed by the second computing device and specific to the client device; and
providing the signed authentication token to the client device, wherein the signed authentication token is usable by the client device to access the resource directly from the second computing device.

22. The system of claim 21, wherein the first request from the client device comprises a first plurality of request parameters authenticated by the first computing device, the first plurality of request parameters including one or more of an identity of the client device or a user, an address of the second computing device, or the resource.

23. The system of claim 21, wherein the client device transmits the signed authentication token and a third request to the second computing device to access the resource.

24. The system of claim 23, wherein the client device obtains the resource directly from the second computing device in response to the second computing device validating the signed authentication token and the third request.

25. The system of claim 24, wherein the resource provided to the client device is not provided to the first computing device.

26. The system of claim 24, wherein a second plurality of request parameters are embedded into the signed authentication token by the second computing device.

27. The system of claim 26, wherein validating the signed authentication token and the third request comprises verifying that the second plurality of request parameters matches a third plurality of request parameters embedded in the third request.

28. The system of claim 21, further comprising authenticating a user associated with the client device.

29. The system of claim 28, further comprising determining that the first request is authorized by verifying that the user is authorized to access the resource being requested.

30. The system of claim 21, wherein the first computing device provides an address of the second computing device to the client device along with the signed authentication token.

* * * * *